United States Patent
Komaru et al.

(10) Patent No.: US 8,956,261 B2
(45) Date of Patent: Feb. 17, 2015

(54) REVOLVING APPARATUS FOR CONSTRUCTION MACHINE

(75) Inventors: Yutaka Komaru, Kasumigaura (JP); Takashi Niidome, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 246 days.

(21) Appl. No.: 13/389,949

(22) PCT Filed: Feb. 7, 2011

(86) PCT No.: PCT/JP2011/052512
§ 371 (c)(1),
(2), (4) Date: Feb. 10, 2012

(87) PCT Pub. No.: WO2011/102252
PCT Pub. Date: Aug. 25, 2011

(65) Prior Publication Data
US 2012/0309577 A1    Dec. 6, 2012

(30) Foreign Application Priority Data

Feb. 22, 2010    (JP) .................................. 2010-035925

(51) Int. Cl.
| | |
|---|---|
| *F16H 57/08* | (2006.01) |
| *E02F 9/20* | (2006.01) |
| *E02F 9/12* | (2006.01) |
| *F16D 55/36* | (2006.01) |
| *F16D 65/853* | (2006.01) |
| *F16D 121/06* | (2012.01) |

(52) U.S. Cl.
CPC .............. *E02F 9/2095* (2013.01); *E02F 9/128* (2013.01); *F16D 55/36* (2013.01); *F16D 65/853* (2013.01); *F16D 2121/06* (2013.01)

USPC ........... 475/331; 475/337; 475/311; 475/149; 475/150; 475/154

(58) Field of Classification Search
USPC .......................... 475/149, 150, 311, 337, 331
See application file for complete search history.

(56) References Cited

U.S. PATENT DOCUMENTS

| | | | |
|---|---|---|---|
| 6,585,088 B1 * | 7/2003 | Fontaine et al. .............. | 188/170 |
| 7,556,580 B2 * | 7/2009 | Saito et al. ..................... | 475/154 |

FOREIGN PATENT DOCUMENTS

| | | | | |
|---|---|---|---|---|
| JP | 56-138964 | | 10/1981 | |
| JP | 64-49673 | | 3/1989 | |
| JP | 2-128803 | | 10/1990 | |
| JP | 2006-025580 | A | 1/2006 | |
| JP | 2007-039990 | A | 2/2007 | |
| JP | 2007039990 | A * | 2/2007 | .............. F16D 55/02 |
| JP | 2008-232269 | A | 10/2008 | |

\* cited by examiner

*Primary Examiner* — Derek D Knight
(74) *Attorney, Agent, or Firm* — Mattingly & Malur, PC (57) ABSTRACT

An electric motor is arranged on a reduction device, and a wet braking device which gives braking force to a motor shaft is arranged on an upper end side of the electric motor. The wet braking device has a brake case which accommodates an upper end portion of the motor shaft, an adapter which is detachably disposed to the motor shaft in the brake case, a plurality of rotating side brake disks and a plurality of non-rotating side brake disks arranged on an outer peripheral side of the adapter and a brake piston which gives braking force to the motor shaft by frictionally engaging the rotating side brake disks and the non-rotating side brake disks with each other. At the time of performing a maintenance operation for the wet braking device, the wet braking device alone can be solely removed while keeping the electric motor assembled to the reduction device.

4 Claims, 5 Drawing Sheets

REVOLVING APPARATUS FOR CONSTRUCTION MACHINE

TECHNICAL FIELD

The present invention relates to a revolving apparatus for use in a construction machine such as a hydraulic excavator or a hydraulic crane or particularly in a construction machine, which is of a type that revolves an upper revolving structure on a lower traveling structure, by using an electric motor.

BACKGROUND ART

In general, a hydraulic excavator as a typical example of a construction machine is largely constituted by an automotive lower traveling structure, an upper revolving structure swingably mounted on the lower traveling structure through a swing circle, and a working mechanism provided on a front side of the upper revolving structure. In particular, to improve driving efficiency and fuel consumption of the hydraulic excavator, the technology concerning motorization of a revolving apparatus has been recently suggested. The revolving apparatus that is driven by an electrically-operated motor is provided between the lower traveling structure and the upper revolving structure, and the upper revolving structure revolves on the lower traveling structure by actuating this revolving apparatus (Patent Document 1).

Here, the revolving apparatus is usually constituted of a reduction device that is disposed to the upper revolving structure and decelerates and outputs input rotation, an electrically-operated revolving motor that is provided on the upper side of the reduction device to input rotation of a motor shaft to the reduction device, and an output shaft that outputs the rotation of the motor shaft decelerated by the reduction device to the swing circle.

Here, a wet multiple-disk braking device (a brake section) that gives braking force to rotation of the revolving motor is provided in the revolving apparatus described in Patent Document 1, and this braking device is arranged between the reduction device (a reducing section) and the revolving motor (a motor section).

Further, as another revolving apparatus according to conventional art, there has been suggested a revolving apparatus having a configuration that a wet multiple-disk braking device (a mechanical brake) is provided between a first-stage reduction mechanism (a first reducing section) and a second-stage reduction mechanism (a second reducing section) in reduction mechanisms provided on three stages in a casing (Patent Document 2).

PRIOR ART DOCUMENTS

Patent Documents

Patent Document 1: Japanese Patent Laid-Open No. 2006-25580 A
Patent Document 2: Japanese Patent Laid-Open No. 2007-39990 A

SUMMARY OF THE INVENTION

However, the revolving apparatus according to Patent Document 1 has the configuration that the braking device is arranged on the upper side of the reduction device and the revolving motor is arranged on the upper side of the braking device. Therefore, when performing a maintenance operation such as maintenance or inspection for the braking device, the revolving motor arranged on the upper side of the braking device must be removed. Further, after end of the maintenance operation, the revolving motor must be again assembled to the upper side of the braking device. As a result, there arises a problem that workability of the maintenance operation for the braking device is lowered.

On the other hand, the revolving apparatus according to Patent Document 2 has the configuration that the braking device is arranged between a first-stage reducing section and a second-stage reducing section constituting the reduction device and the revolving motor is arranged on the upper side of the reduction mechanism. Therefore, when performing the maintenance operation for the braking device, it is necessary to not only remove the revolving motor arranged on the upper side of the reduction device but also remove the first-stage reducing section from the casing. As a result, there occurs a problem that workability at the time of performing the maintenance operation for the braking device is further lowered.

Moreover, the revolving apparatus according to Patent Document 2 has the braking device arranged between the first-stage reducing section and the second-stage reducing section constituting the reduction device. Therefore, the braking device can be cooled with use of a lubricant oil stored in the casing to lubricate the reduction device. However, in case of using the braking device to make a sudden stop of a revolving operation of the upper revolving structure, since a large amount of heat is generated from the braking device, there arises a problem that the braking device cannot be efficiently cooled by just using the lubricant oil stored in the casing.

In view of the above-described problems in the conventional art, it is an object of the present invention to provide a revolving apparatus for a construction machine that can improve the workability of a maintenance operation for a braking device and efficiently cool the braking device.

(1) To solve the above-described problems, the present invention is applied to a revolving apparatus for a construction machine, comprising: a reduction device which is disposed to an upper revolving structure mounted on a lower traveling structure through a swing circle so as to extend in the upper and lower directions and decelerates and outputs input rotation; an electric motor which is arranged on the reduction device and inputs rotation of a motor shaft to the reduction device; and an output shaft which outputs the rotation of the motor shaft decelerated by the reduction device to the swing circle.

A configuration adopted by the present invention is characterized in that a wet braking device which gives braking force with respect to the rotation of the motor shaft is provided on an upper end side of the electric motor.

With this arrangement, since the braking device is provided on the upper end side of the electric motor, the braking device alone can be removed from the upper end side of the electric motor to carryout the maintenance operation. On the other hand, after end of the maintenance, just disposing the braking device to the upper end side of the electric motor enables rapidly assembling the revolving apparatus constituted of the reduction device, the electric motor, and the braking device. As described above, since the other members, e.g., the electric motor and the like do not have to be detached in order to remove the braking device, the workability when performing the maintenance operation such as maintenance or inspection for the braking device can be improved.

(2) In case of (1) mentioned above, the wet braking device comprises: a brake case which is disposed on an upper end side of the electric motor and accommodates an upper end portion of the motor shaft therein; an adapter which is detachably disposed to the motor shaft in the brake case; a plurality of rotating side brake disks arranged on an outer peripheral side of the adapter in the brake case; a plurality of non-rotating side brake disks arranged on an inner peripheral side of the brake case in a state of alternately overlapping the respective rotating side brake disks; a brake piston which gives braking force to the motor shaft by using pushing force of a spring member to frictionally engage the rotating side brake disks and the non-rotating side brake disks with each other and releases braking with respect to the motor shaft against the spring member based on supply of a brake release pressure from the outside; and a lubricant oil supplied into the brake case.

With this configuration, the adapter can be detachably disposed to the motor shaft accommodated in the brake case, and the plurality of rotating side brake disks constituting the braking device can be disposed to the outer peripheral side of the adapter. Therefore, for example, as compared with a case where the plurality of rotating side brake disks are directly disposed to the outer peripheral side of the motor shaft, it is possible to suppress partial damage to a rotating side brake disk attachment portion of the motor shaft, and a lifetime of the entire electric motor including the motor shaft can be extended.

Further, when the plurality of rotating side brake disks are disposed to the outer peripheral side of the adapter and the plurality of non-rotating side brake disks are arranged between the respective rotating side brake disks in an overlapping manner, an assembly (a sub-assembly) constituted by the adapter, the plurality of rotating side brake disks, and the plurality of non-rotating side brake disks can be assembled in advance. Therefore, when the adapter having the plurality of rotating side brake disks and non-rotating side brake disks disposed thereto is assembled to the motor shaft in the brake case in a state in which the brake case is assembled to the upper end side of the electric motor, the respective non-rotating side brake disks can be arranged on the inner peripheral side of the brake case in a state in which the respective non-rotating side brake disks and the respective rotating side brake disks are arranged to overlap each other.

As a result, it is possible to eliminate a complicated assembling work, i.e., arranging the plurality of rotating side brake disks and non-rotating side brake disks on the outer peripheral side of the motor shaft and the inner peripheral side of the brake case while alternating overlapping them one by one, thereby greatly improving the workability when assembling the braking device to the electric motor.

(3) In case of (2) mentioned above, the present invention has a configuration that a bearing which rotatably supports the adapter with respect to the brake case is provided between the adapter and the brake case, a dust seal which captures foreign particles mixed in the lubricant oil is provided to the bearing, and an oil seal which is placed below the bearing and seals in the lubricant oil with respect to the electric motor is provided on an outer peripheral side of the motor shaft.

With this arrangement, when the dust seal is provided to the bearing which rotatably supports the adapter, foreign particles (dusts) such as abrasion powder produced by frictional engagement between the rotating side brake disks and the non-rotating side brake disks in the braking device can be captured by the dust seal. On the other hand, providing the oil seal on the outer peripheral side of the motor shaft enables preventing the lubricant oil of the brake device from flowing into the electric motor side, thereby prolonging the lifetime of the electric motor.

In this case, since the oil seal is arranged below the bearing, the dust seal provided to the bearing can assuredly prevent the dust from the braking device from adhering to a contact portion between the oil seal and the motor shaft.

(4) According to the present invention, a lubricant oil inlet port which is placed near the rotating side brake disks and the non-rotating side brake disks and through which the lubricant oil flows in is provided on a lower end side of the brake case, and a lubricant oil outlet port through which the lubricant oil flowing between the rotating side brake disks and the non-rotating side brake disks flows out is provided in an upper end portion of the brake case.

With this configuration, the lubricant oil can be circulated in the brake case through the lubricant oil inlet port provided on the lower end side of the brake case and the lubricant oil outlet port provided on the upper end portion of the same. As a result, for example, in a case of suddenly stopping the revolving operation of the upper revolving structure by the braking device, even if a large amount of heat is produced by the frictional engagement between the rotating side brake disks and the non-rotating side brake disks, this heat can be efficiently cooled by the lubricant oil circulating in the brake case.

Further, providing the lubricant oil outlet port at the upper end portion of the brake case enables assuredly discharging air to the outside of the brake case through the lubricant oil outlet port even if the air is mixed in the lubricant oil flowing into the brake case. As a result, the air can be prevented from staying in the brake case, and cooling effect for the braking device can be increased by filling the brake case with a large amount of lubricant oil.

Furthermore, the lubricant oil that has flowed in the brake case flows to the outside of the brake case through the lubricant oil outlet port after passing through a space between each rotating side brake disk and each non-rotating side brake disk. As a result, the dust such as abrasion powder generated from a frictionally engaged portion of each rotating side brake disk and each non-rotating side brake disk can be washed off by the lubricant oil, thus adequately maintaining braking force of the braking device for a long time.

(5) According to the present invention, the lubricant oil uses a part of an operating oil supplied to hydraulic actuators mounted in the upper revolving structure and the lower traveling structure. With this arrangement, the operating oil which is supplied to/discharged from the hydraulic actuators mounted in the upper revolving structure and the lower traveling structure can be used as the lubricant oil. Therefore, any special lubricant oil does not have to be used in order to cool the braking device, a tank and the like which hold this lubricant oil are no longer necessary, and the number of components in the entire braking device can be decreased, thereby contributing to a reduction in cost.

(6) According to the present invention, a male spline portion is provided to an upper end portion of the motor shaft, a female spline portion which engages with the male spline portion of the motor shaft is provided on the inner peripheral side of the adapter, the brake case comprises: a cylindrical case body which is opened on an upper side and accommodates the motor shaft, the adapter, the rotating side brake disks, the non-rotating side brake disks, the brake piston, and the spring member; and a lid member that covers an upper side of the case body, and the adapter, the rotating side brake disks, and the non-rotating side brake disks are disposed to the male spline portion of the motor shaft in the upper and lower directions with the lid member removed from the case body.

With this configuration, in a state in which the case body of the brake case has been assembled to the motor case of the electric motor and the lid member has been removed from this case body, the assembly having the plurality of rotating side brake disks and non-rotating side brake disks disposed to the adapter in an alternately overlapping manner can be inserted into the case body of the brake case from above. Moreover, when the female spline portion of the adapter is engaged with the male spline portion of the motor shaft in the case body of the brake case, each non-rotating side brake disk can be easily assembled into the case body.

MODE FOR CARRYING OUT THE INVENTION

Hereinafter, embodiments of a revolving apparatus for a construction machine according to the present invention will be described in detail with reference to the accompanying drawings, by citing as an example a case where a revolving apparatus for a construction machine is applied to a hydraulic excavator.

In the drawings, designated at 1 is a hydraulic excavator which is a representative example of a construction machine. The hydraulic excavator 1 is largely constituted by a crawler type automotive lower traveling structure 2 and an upper revolving structure 3 mounted swingably on the lower traveling structure 2, and a working mechanism 4 is provided liftably on a front side of the upper revolving structure 3. A later-described swing circle 5 is provided between the lower traveling structure 2 and the upper revolving structure 3, and the upper revolving structure 3 is supported swingably on the lower traveling structure 2 through the swing circle 5.

Figure 1:
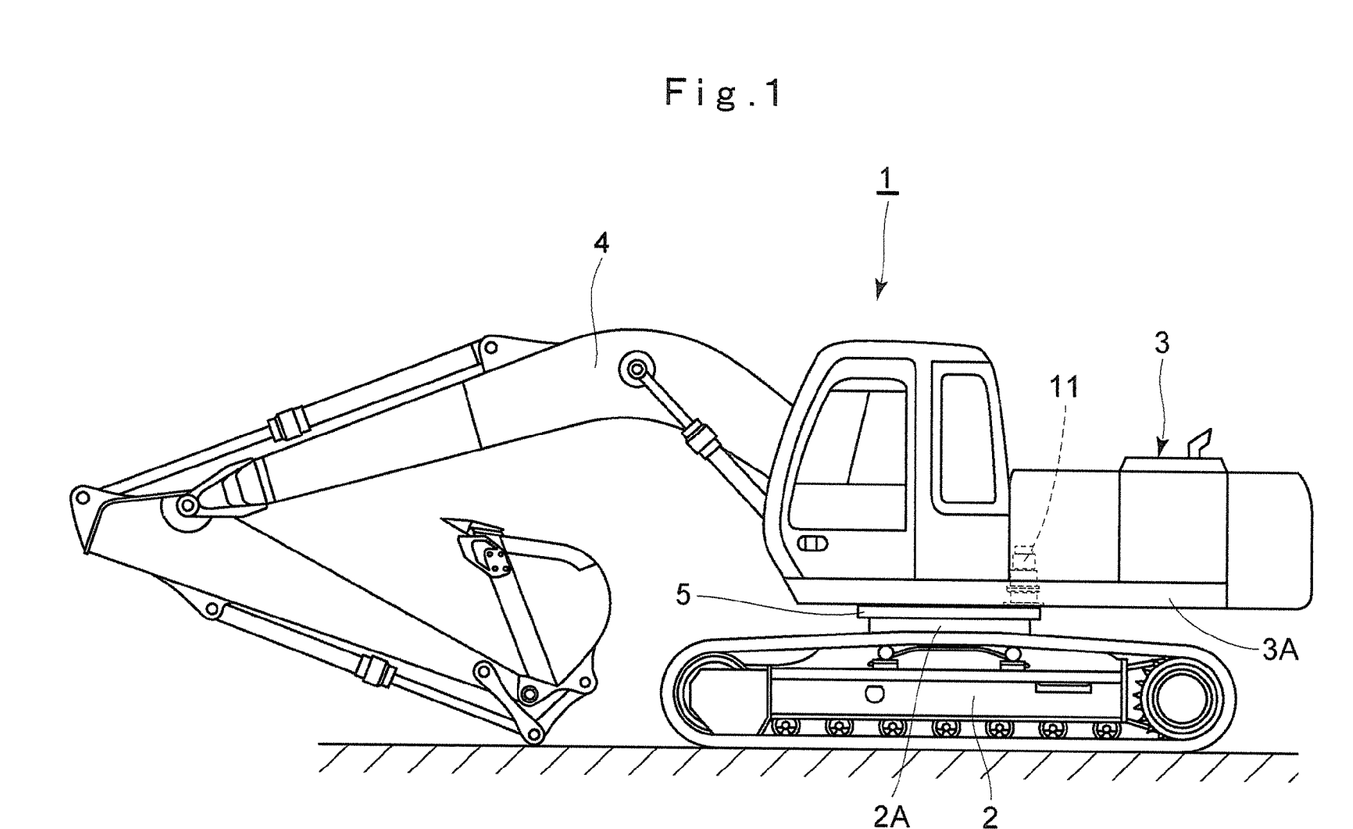
FIG. 1 is a front view showing a hydraulic excavator including a revolving apparatus according to an embodiment of the present invention.
Figure 2:
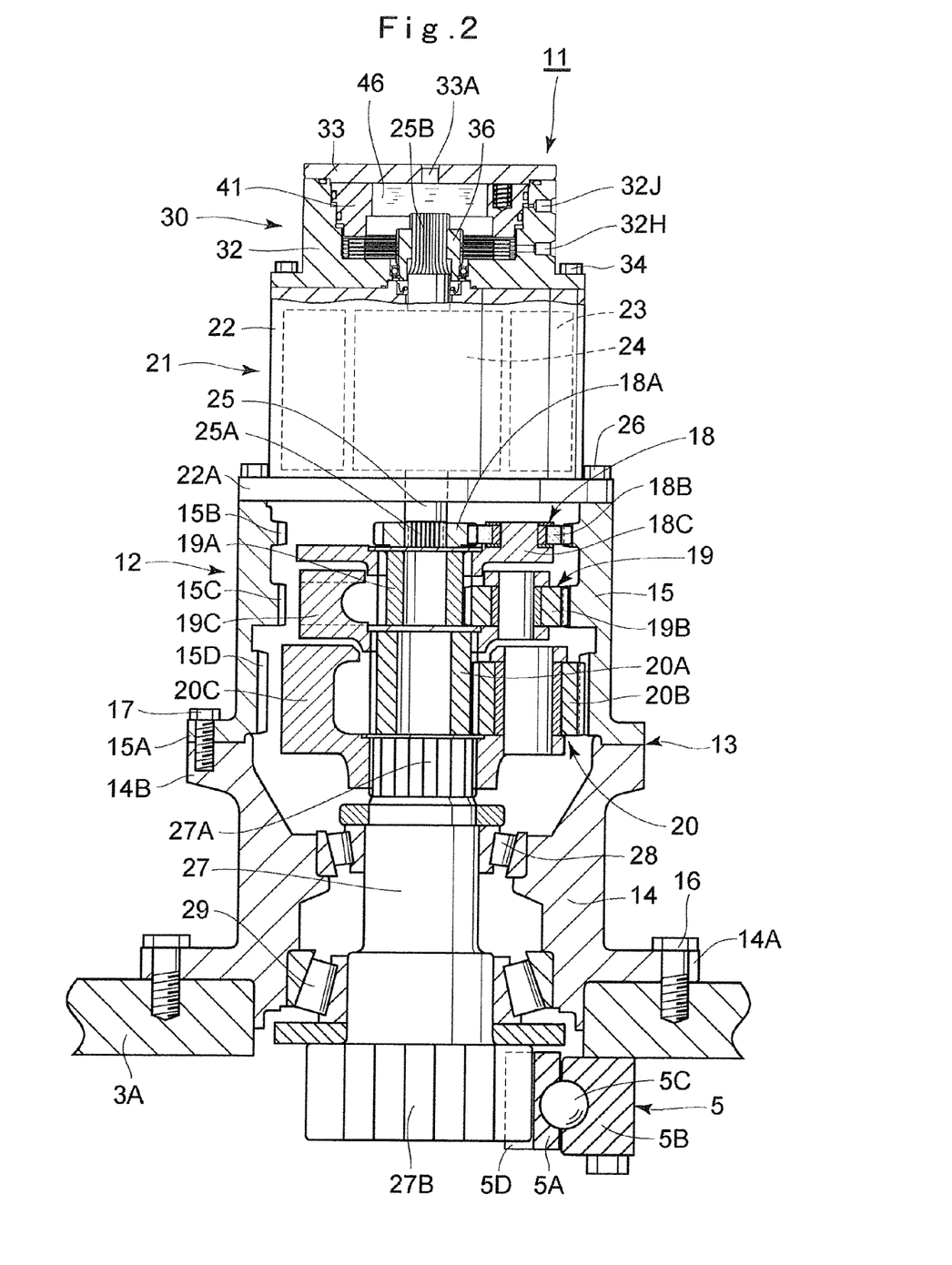
FIG. 2 is a cross-sectional view showing the revolving apparatus according to the embodiment of the present invention.

Indicated at 5 is the swing circle provided between the lower traveling structure 2 and the upper revolving structure 3, and the swing circle 5 is constituted by an inner race 5A fixed on a circle member 2A of the lower traveling structure 2 shown in FIG. 1, an outer race 5B fixed on a lower surface side of a revolving frame 3A serving as a base of the upper revolving structure 3, and many steel balls 5C (only one ball is shown) provided between the inner race 5A and the outer race 5B. Internal teeth 5D are formed on the inner peripheral side over the entire circumference of the inner race 5A. When a later-described revolving apparatus 11 operates and the outer race 5B fixed to the revolving frame 3A thereby rotates around the inner race 5A, the upper revolving structure 3 performs the revolving operation on the lower traveling structure 2.

Next, designated at 11 is the revolving apparatus according to this embodiment, and the revolving apparatus 11 allows the upper revolving structure 3 supported on the lower traveling structure 2 to revolve through the swing circle 5. Here, the revolving apparatus 11 is constituted by a reduction device 12, an electric motor 21, an output shaft 27, a wet braking device 30, and the like, which will be described later.

Denoted at 12 is the reduction device mounted on the revolving frame 3A of the upper revolving structure 3, and the reduction device 12 decelerates input rotation input from the later-described electric motor 21 and outputs the decelerated output to the later-described output shaft 27. Here, the reduction device 12 is largely constituted by a later-described housing 13, a first-stage planetary gear reduction mechanism 18, a second-stage planetary gear reduction mechanism 19, and a third-stage planetary gear reduction mechanism 20.

Indicated at 13 is a housing serving as an outer shell, and the housing 13 is formed of a cylindrical lower housing 14 disposed to an upper surface side of the revolving frame 3A and a cylindrical upper housing 15 disposed to an upper end side of the lower housing 14. Therefore, the housing 13 extends upwardly (in the upper and lower directions) from an upper surface of the revolving frame 3A. Here, a disk-shaped lower flange portion 14A having a large diameter and an upper flange portion 14B are provided on both end sides of the lower housing 14 in the upper and lower directions, respectively. This lower flange portion 14A is fixed to the revolving frame 3A by using bolts 16, and an upper housing 15 is attached to the upper flange portion 14B.

On the other hand, a disk-shaped lower flange portion 15A having a large diameter is provided on a lower end side of the upper housing 15, and the lower flange portion 15A is fixed to the upper flange portion 14B of the lower housing 14 by using a bolt 17. A later-described electric motor 21 is attached to an upper end side of the upper housing 15. Further, three internal gears 15B, 15C, and 15D are formed on the entire inner circumferential side of the upper housing 15 so as to be apart from each other in the upper and lower directions, respectively.

Indicated at 18 is the first-stage planetary gear reduction mechanism arranged in the upper housing 15, and the planetary gear reduction mechanism 18 is constituted by a sun gear 18A splined to a motor shaft 25 of the electric motor 21 to be described later, a plurality of planetary gears 18B (only one is shown) that mesh with the sun gear 18A and the internal gear 15B of the upper housing 15 and move around the sun gear 18A while rotating on an axis thereof, and a carrier 18C that rotatably supports each planetary gear 18B.

Indicated at 19 is the second-stage planetary gear reduction mechanism arranged below the planetary gear reduction mechanism 18, and the planetary gear reduction mechanism 19 is constituted by a sun gear 19A splined to the carrier 18C of the first-stage planetary reduction mechanism 18, a plurality of planetary gears 19B that mesh with the sun gear 19A and the internal gear 15C of the upper housing 15 and move around the sun gear 19A while rotating on an axis thereof, and a carrier 19C that rotatably supports each planetary gear 19B.

Indicated at 20 is the third-stage (last-stage) planetary gear reduction mechanism arranged below the planetary gear reduction mechanism 19, and the planetary gear reduction mechanism 20 is constituted by a sun gear 20A splined to the carrier 19C of the second-stage planetary gear reduction mechanism 19, a plurality of planetary gears 20B that mesh with the sun gear 20A and the internal gear 15D of the upper housing 15 and move around the sun gear 20A while rotating on an axis thereof, and a carrier 20C that rotatably supports each planetary gear 20B. The carrier 20C of the planetary gear reduction mechanism 20 is configured to be splined to an upper end side of an output shaft 27 to be described later.

Next, denoted at 21 is an electric motor provided above the reduction device 12, and the electric motor 21 serves as a rotational source configured to drive the later-described output shaft 27. Here, the electric motor 21 is largely constituted by a cylindrical motor case 22 having a large-diameter lower flange portion 22A provided to a lower end side thereof, a stator 23 provided to be fixed in the motor case 22, a rotatably provided rotor 24, and a motor shaft 25 which rotates integrally with the rotor 24.

Figure 3:
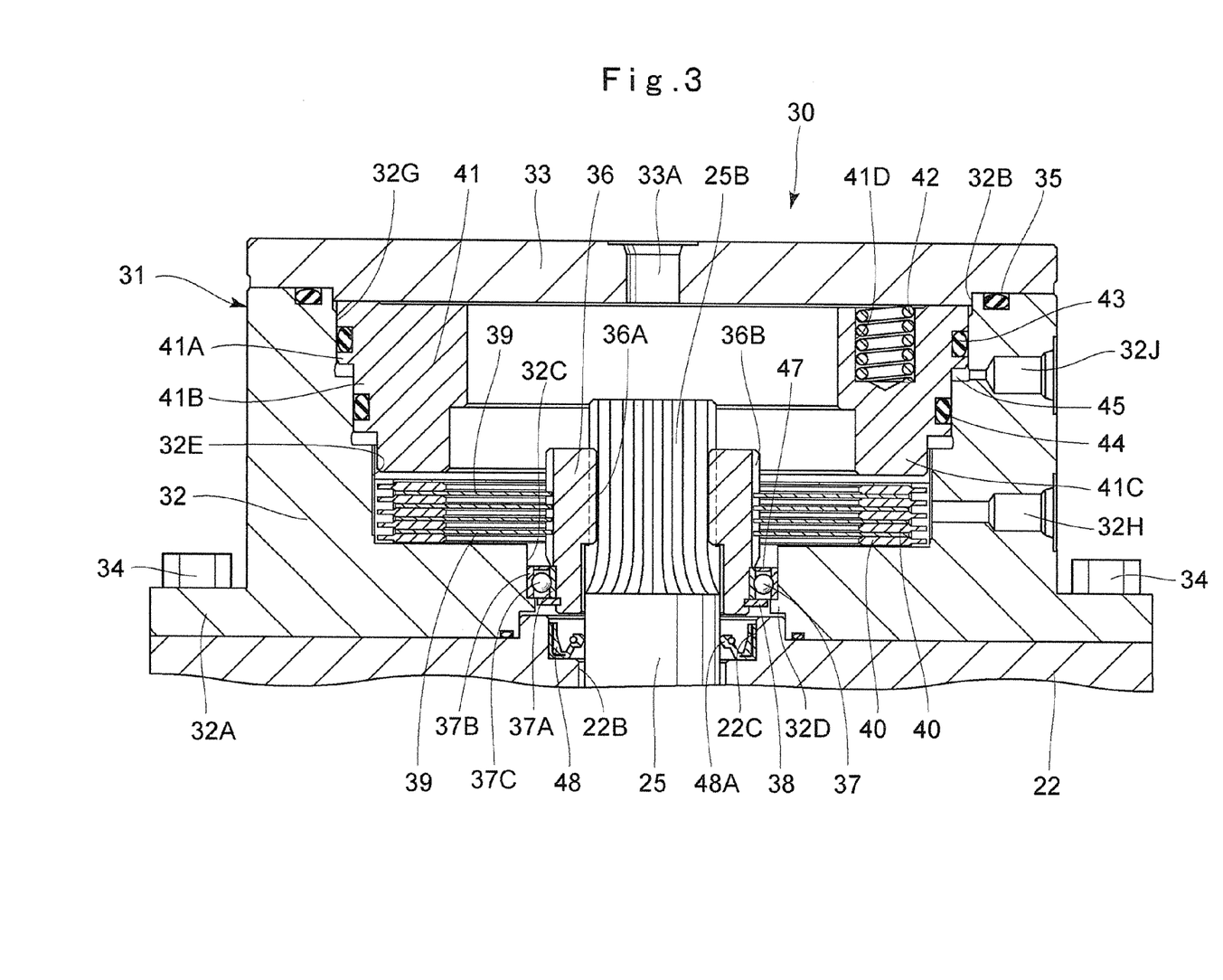
FIG. 3 is an enlarged cross-sectional view showing a braking device shown in FIG. 2.

In this case, as shown in FIG. 3, a shaft through hole 22B bored in an axial direction (the upper and lower directions) is formed at a central portion of the motor case 22. On the other hand, a seal fitting portion 22C formed of a large-diameter hole, which surrounds the shaft through hole 22B and in which an oil seal 48 to be described later is fitted is provided on an upper end side of the motor case 22. The electric motor 21 is disposed to an upper end side of the reduction device 12 by fixing the lower flange portion 22A of the motor case 22 to an upper end portion of the upper housing 15 by using bolts 26.

On the other hand, the both end sides of the motor shaft 25 protrude toward the outside of the motor case 22 via the shaft through hole 22B. Further, a lower male spline portion 25A is formed over the entire circumference on the lower end side of the motor shaft 25, and an upper male spline portion 25B is formed over the entire circumference on the upper end side of the motor shaft 25. Therefore, in a state in which the electric motor 21 is disposed to the upper end side of the reduction device 12, the lower male spline portion 25A of the motor shaft 25 is downwardly inserted in the upper housing 15 and splined to the first-stage sun gear 18A. On the other hand, the upper male spline portion 25B, which is the upper end portion of the motor shaft 25 protrudes from the upper surface portion of the motor case 22, and the upper male spline portion 25B is inserted toward the inside of a later-described brake case 31 to be accommodated in the brake case 31.

Indicated at 27 is the output shaft rotatably provided in the housing 13, and the output shaft 27 is rotatably supported in the lower housing 14 through an upper bearing 28 and a lower bearing 29 to extend in the upper and lower directions (an axial direction) in the housing 13. Here, the male spline portion 27A is formed on the upper end side of the output shaft 27, and the male spline portion 27A is splined to the carrier 20C of the third-stage planetary gear reduction mechanism 20. On the other hand, a pinion 27B is integrally provided on the lower end side of the output shaft 27, and the pinion 27B downwardly protrudes from the lower end portion of the lower housing 14 and meshes with the internal teeth 5D provided to the inner race 5A of the swing circle 5.

Therefore, the rotation of the motor shaft 25 of the electric motor 21 is decelerated in three stages by the planetary gear reduction mechanisms 18, 19, and 20 and transmitted to the output shaft 27 in this state, and the output shaft 27 rotates at a lower speed with large turning force (torque). As a result, the pinion 27B of the output shaft 27 moves around the inner race 5A while meshing with the internal teeth 5D of the swing circle 5, and revolving force of the pinion 27B is transmitted to a revolving frame 3A through the housing 13, whereby the upper revolving structure 3 shown in FIG. 1 revolves on the lower traveling structure 2.

Figure 4:
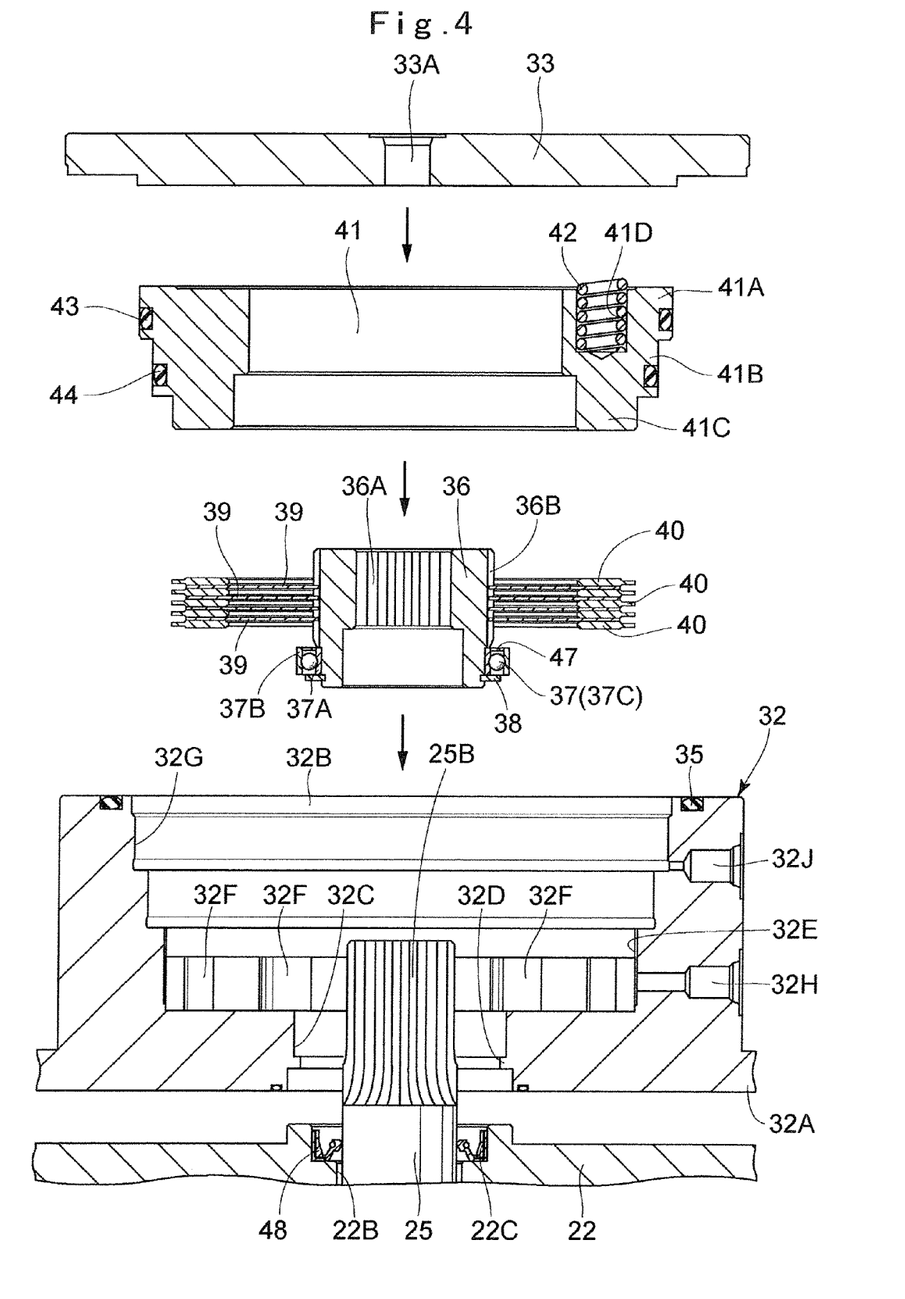
FIG. 4 is an exploded view showing an assembling state of the braking device.

Next, designated at 30 is the wet braking device according to this embodiment, and the wet braking device 30 is arranged on the upper end side of the electric motor 21. Here, a negative type braking device that gives braking force with respect to the rotation of the motor shaft 25 of the electric motor 21 is used as the wet braking device 30. As shown in FIG. 3 and FIG. 4, the wet braking device 30 is constituted by a brake case 31, an adapter 36, rotating side brake disks 39, non-rotating side brake disks 40, a brake piston 41, a lubricant oil 46, and the like, which will be described later.

Indicated at 31 is the brake case serving as an outer shell of the wet braking device 30, and the brake case 31 is formed as a bottomed cylindrical body whose upper side is opened and whose lower side is a bottom portion. This brake case 31 is constituted by a stepped cylindrical case body 32 which has a large-diameter disk-shaped lower flange portion 32A provided on a lower end side thereof and has an opening end 32B on an upper end side thereof, and a disk-shaped lid member 33 which is detachably disposed to the upper end side of the case body 32 by using a bolt (not shown) and covers the opening end 32B.

Here, a shaft through hole 32C in which the upper male spline portion 25B of the motor shaft 25 and the later-described adapter 36 are inserted is provided at a shaft central position of the case body 32 on the bottom portion side, and an annular bearing mounting portion 32D for attaching a later-described bearing 37 is provided on the inner peripheral side of the shaft through hole 32C so as to protrude toward the inner side in the radial direction. On the other hand, a brake disk accommodating recessed portion 32E that accommodates the rotating side brake disks 39 and the non-rotating side brake disks 40 to be described later is formed on the inner peripheral side of the case body 32 so as to be placed above the shaft through hole 32C, and the brake disk accommodating recessed portion 32E is a bottomed annular recessed portion surrounding the shaft through hole 32C.

As shown in FIG. 4, a plurality of engaging recessed grooves 32F extending in an axial direction are formed on the inner peripheral surface of the brake disk accommodating recessed portion 32E at fixed intervals in the circumferential direction, and the outer peripheral side of each non-rotating side brake disk 40 engages with the engaging recessed groove 32F. Further, a stepped piston insertion hole 32G is formed on the inner peripheral side of the case body 32 so as to be placed above the brake disk accommodating recessed portion 32E, and a brake piston 41 which will be described later is slidably fitted in the piston insertion hole 32G.

Furthermore, a lubricant oil inlet port 32H, which is opened near the later-described rotating side brake disks 39 and non-rotating side brake disks 40, is formed at a position corresponding to the brake disk accommodating recessed portion 32E of the case body 32 in the radial direction. A brake release pressure inlet port 32J opened in a later-described oil chamber 45 is formed at a position corresponding to the piston insertion hole 32G of the case body 32 in the radial direction. On the other hand, a lubricant oil outlet port 33A is formed at an axis center position of the lid member 33, and the later-described lubricant oil 46 supplied into the case body 32 through the lubricant oil inlet port 32H flows out from the case body 32 through the lubricant oil outlet port 33A.

The lower flange portion 32A of the case body 32 is fixed to the upper end portion of the motor case 22 constituting the electric motor 21 by using bolts 34. As a result, the wet braking device 30 is detachably disposed to the upper end side of the electric motor 21. Additionally, an annular seal 35 that liquid-tightly seals a portion between the opening end 32B of the case body 32 and the lid member 33 is provided between both these members.

Indicated at 36 is the adapter detachably disposed to the upper end portion of the motor shaft 25 inserted into the brake case 31. This adapter 36 is formed into a cylindrical shape, and a female spline portion 36A splined to the upper male spline portion 25B of the motor shaft 25 is formed on the inner peripheral side of the adapter 36 over the entire circumference. On the other hand, a brake disk engaging groove 36B extending in the axial direction is formed on the outer peripheral side of the adapter 36 over the entire circumference, and the inner peripheral side of each rotating side brake disk 39 engages with this brake disk engaging groove 36B.

Indicated at 37 is a bearing provided between the adapter 36 and the brake case 31, and the bearing 37 rotatably supports the adapter 36 with respect to the case body 32 of the brake case 31. Here, the bearing 37 is constituted by an inner race 37A fitted in the outer periphery below the brake disk engaging groove 36B of the adapter 36, an outer race 37B disposed to the bearing mounting portion 32D of the case body 32, and a plurality of steel balls 37C provided between the inner race 37A and the outer race 37B. Further, a lower end side of the inner race 37A is supported by a stop ring 38 disposed to the outer peripheral side of the adapter 36.

Indicated at 39 is the plurality of rotating side brake disks arranged on the outer peripheral side of the adapter 36, and each rotating side brake disk 39 is formed into an annular plate and accommodated in the brake disk accommodating recessed portion 32E of the case body 32 in a state of alternately overlapping the later-described non-rotating side brake disk 40 in the axial direction. Here, the inner peripheral side of each rotating side brake disk 39 engages with the brake disk engaging groove 36B of the adapter 36 so as to be movable in the axial direction. As a result, each rotating side brake disk 39 rotates integrally with the motor shaft 25 through the adapter 36 in a state in which the rotating side brake disk 39 can move in the axial direction with respect to the adapter 36.

Indicated at 40 is the plurality of non-rotating side brake disks arranged on the inner peripheral side of the brake case 31 in a state of overlapping each rotating side brake disk 39, and each non-rotating side brake disk 40 is formed into an annular plate and accommodated in the brake disk accommodating recessed portion 32E of the case body 32 in a state of alternately overlapping each rotating side brake disk 39 in the axial direction. The outer peripheral side of each non-rotating side brake disk 40 engages with the engaging recessed groove 32F formed on the inner peripheral surface of the brake disk accommodating recessed portion 32E. As a result, each non-rotating side brake disk 40 can move in the axial direction with respect to the brake case 31 and does not rotate with respect to the brake case 31.

Indicated at 41 is the brake piston inserted and fitted in the piston insertion hole 32G of the brake case 31 (the case body 32) so as to be slidable in the axial direction, and the brake piston 41 gives braking force to the rotation of the motor shaft 25 by frictionally engaging the rotating side brake disks 39 and the non-rotating side brake disks 40 by pushing. Here, the brake piston 41 is formed into a stepped cylindrical form as a whole, and it includes a large-diameter cylinder portion 41A and a small-diameter cylinder portion 41B which are slidably inserted and fitted in each stepped portion of the piston insertion hole 32G and a pressing portion 41C which is provided below the small-diameter cylinder portion 41B and protrudes into the brake disk accommodating recessed portion 32E.

Further, a plurality of bottomed spring accommodating holes 41D (only one hole is shown) extending in the axial direction are provided on the upper end side of the brake piston 41 to be apart from each other in the circumferential direction, and a spring member 42 is arranged in each spring accommodating hole 41D. The brake piston 41 is constantly pushed toward the lower side (a direction in which the brake piston 41 moves closer to the rotating side brake disks 39 and the like) by the spring member 42, and each rotating side brake disk 39 and each non-rotating side brake disk 40 are frictionally engaged by pressing both these members by the pressing portion 41C. As a result, the rotation of each rotating side brake disk 39 is restricted, and the braking force is given to the motor shaft 25 through the adapter 36.

Indicated at 43 is an annular upper seal provided on the outer peripheral side of the large-diameter cylinder portion 41A of the brake piston 41, and indicated at 44 is an annular lower seal provided on the outer peripheral side of the small-diameter cylinder portion 41B of the brake piston 41. The upper seal 43 and the lower seal 44 liquid-tightly seals a portion between the outer peripheral surface of the brake piston 41 and the inner peripheral surface of the brake case 31 (the piston insertion hole 32G).

Indicated at 45 is the oil chamber provided between the inner peripheral surface of the piston insertion hole 32G of the brake case 31 and the outer peripheral surface of the brake piston 41. This oil chamber 45 is placed at a corner portion between the large-diameter cylinder portion 41A and the small-diameter cylinder portion 41B of the brake piston 41, and it is formed as an annular space over the entire circumference of the piston insertion hole 32G of the case body 32. Therefore, the oil chamber 45 is sandwiched between the upper seal 43 and the lower seal 44 in the upper and lower directions and held in a liquid-tight state. Accordingly, the brake release pressure inlet port 32J provided to the case body 32 constantly communicates with the oil chamber 45.

Therefore, when a pressure oil (a brake release pressure) is not supplied into the oil chamber 45 through the brake release pressure inlet port 32J, the brake piston 41 frictionally engages each rotating side brake disk 39 and each non-rotating side brake disk 40 with each other by pushing force of the spring member 42, thereby giving the braking force to the motor shaft 25 through the adapter 36. On the other hand, when the pressure oil is supplied into the oil chamber 45 through the brake release pressure inlet port 32J, the brake piston 41 moves away from the rotating side brake disks 39 and the like against the spring member 42, thereby releasing braking with respect to the motor shaft 25.

In this case, the plurality of rotating side brake disks 39 constituting the wet braking disks 30 are disposed to the outer peripheral side of the adapter 36 splined to the motor shaft 25. As a result, for example, as compared with a case in which the respective rotating side brake disks 39 are directly disposed to the outer peripheral side of the motor shaft 25, regions in the motor shaft 25 to which the respective rotating side brake disk 39 are disposed can be prevented from being damaged, whereby a lifetime of the entire electric motor 21 including the motor shaft 25 can be extended.

Figure 5:
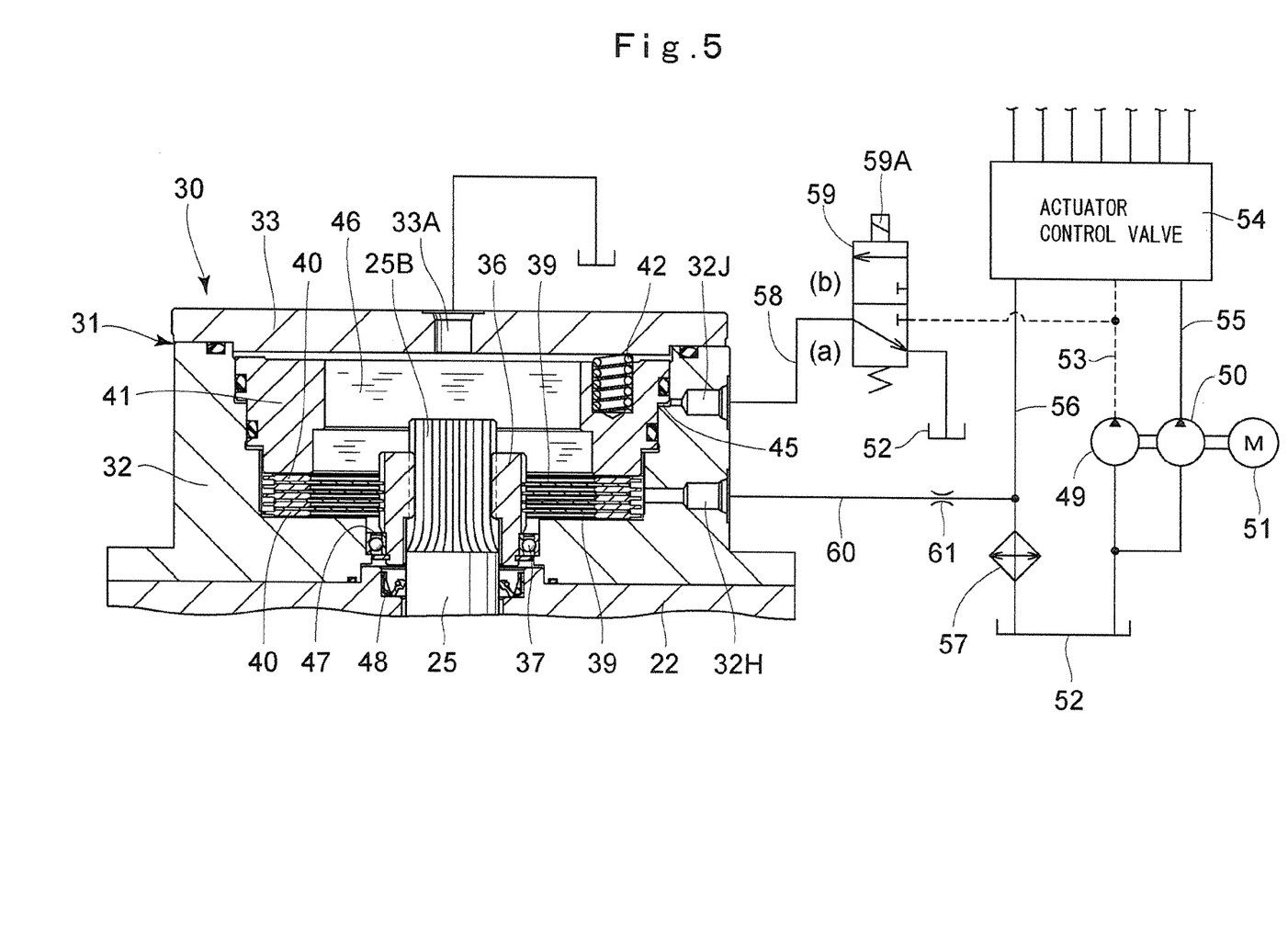
FIG. 5 is a hydraulic circuit diagram showing a supply line of a lubricant oil and a brake release pressure supplied to the braking device.

Next, denoted at 46 is a lubricant oil supplied into the brake case 31. As shown in FIG. 5, the lubricant oil 46 lubricates the respective rotating side brake disks 39 and the respective non-rotating side brake disks 40 accommodated in the brake case 31 and also cools down heat generated by the frictional engagement between the rotating side brake disks 39 and the non-rotating side brake disks 40 at the time of braking with respect to the motor shaft 25. Therefore, the lubricant oil 46 has both a lubricating function and a cooling function with respect to the rotating side brake disks 39 and the non-rotating side brake disks 40.

Here, this embodiment employs an operating oil that is supplied to a hydraulic actuator such as an hydraulic motor (not shown) for traveling mounted in the lower traveling structure 2 or a hydraulic cylinder provided to the working mechanism 4 as the lubricant oil 46.

Denoted at 47 is a dust seal provided on the upper end side of the bearing 37 that rotatably supports the adapter 36, and the dust seal 47 is formed of an annular plate corresponding to a gap between the inner race 37A and the outer race 37B of the bearing 37 to fill the gap between the inner race 37A and the outer race 37B. The dust seal 47 captures foreign particles (dust) such as abrasion powder mixed in the lubricant oil 46 supplied into the brake case 31 and prevents this dust from flowing down through the bearing 37.

Denoted at 48 is an oil seal that is placed below the bearing 37 to seal the outer peripheral side of the motor shaft 25, and the oil seal 48 seals in the lubricant oil 46 supplied to the inside of the brake case 31 with respect to the electric motor 21. Here, the oil seal 48 is disposed to the motor case 22 in a state in which the outer peripheral side of the oil seal 48 is fitted to the seal fitting portion 22C of the motor case 22 and allows a lip portion 48A on the inner peripheral side to slidably come into contact with the outer peripheral surface of the motor shaft 25 with appropriate elasticity, thereby blocking the lubricant oil 46 with respect to the electric motor 21.

As described above, in this embodiment, providing the oil seal 48 on the outer peripheral side of the motor shaft 25 can prevent the lubricant oil 46 in the brake case 31 from entering the electric motor 21. On the other hand, when dust such as abrasion powder generated by frictional engagement between the rotating side brake disks 39 and the non-rotating side brake disks 40 of the wet braking device 30 is captured by the dust seal 47, the dust can be prevented from adhering to a contact part between the lip portion 48A of the oil seal 48 and the motor shaft 25.

Next, a hydraulic circuit which supplies the pressure oil (the brake release pressure) to the oil chamber 45 and also supplies the lubricant oil 46 into the brake case 31 will be described with reference to FIG. 5.

In the drawing, indicated at 49 is a pilot pump mounted in the upper revolving structure 3, and indicated at 50 is a main pump. The pilot pump 49 and the main pump 50 are rotationally driven by an engine 51 to discharge the operating oil stored in an operating oil tank 52.

A pilot pressure oil discharged from the pilot pump 49 is introduced into a hydraulic pressure pilot portion of an actuator control valve 54 through a pilot line 53 to perform switching control over the actuator control valve 54 in accordance with an operation of an operation device (not shown) such as an operation lever, a pedal, and the like.

On the other hand, the pressure oil discharged from the main pump 50 is introduced into the actuator control valve 54 through a discharge line 55 and supplied to a desired hydraulic actuator (not shown) constituting the working mechanism 4 and the like through the actuator control valve 54. On the other hand, a return oil from the hydraulic actuator is introduced into a cooler 57 (an oil cooler) from the actuator control valve 54 through a return line 56, cooled by the cooler 57, and flows back to the operating oil tank 52.

Indicated at 58 is a brake release pressure line that allows a middle region of the pilot line 53 to communicate with the brake release pressure inlet port 32J of the brake case 31, and indicated at 59 is a brake control valve provided in the middle of the brake release pressure line 58. Here, the brake control valve 59 is formed of a three-port two-position solenoid valve, for example, and it maintains a brake position (a) when no signal is supplied to the solenoid operated pilot portion 59A or is switched to a brake release position (b) when a signal is supplied to the solenoid operated pilot portion 59A.

Therefore, for example, in a state in which the hydraulic excavator 1 is stopped and no signal is supplied to the solenoid operated pilot portion 59A, the brake control valve 59 maintains the brake position (a), whereby the oil chamber 45 of the wet braking device 30 communicates the operating oil tank 52. Consequently, as shown in FIG. 5, the brake piston 41 frictionally engages each rotating side brake disk 39 and each non-rotating side brake disk 40 with each other by pushing force of the spring member 42, thereby giving the braking force to the motor shaft 25.

On the other hand, for example, when a signal is supplied to the solenoid operated pilot portion 59A in an operation mode of the engine 51, the brake control valve 59 is switched to the brake release position (b). As a result, the pilot pressure oil discharged from the pilot pump 49 is partially supplied into the oil chamber 45 from the pilot line 53 through the break release pressure inlet port 32J of the brake case 31. Consequently, as shown in FIG. 3, the brake piston 41 moves away from the rotating side brake disks 39 and the like against the spring member 42 to release the frictional engagement between the respective rotating side brake disks 39 and the respective non-rotating side brake disks 40, thereby releasing braking with respect to the motor shaft 25.

On the other hand, indicated at 60 is a lubricant oil line communicating the return line 56 with the lubricant oil inlet port 32H of the brake case 31, one end side of the lubricant oil line 60 is connected to a middle region of the return line 56 on the upstream side of the cooler 57, and the other end side is connected to the lubricant oil inlet port 32H of the brake case 31.

Therefore, in the operation mode of the hydraulic excavator 1, the return oil that flows back to the operating oil tank 52 from the hydraulic actuator through the actuator control valve 54 is partially supplied into the brake case 31 from the lubricant oil line 60 through the lubricant oil inlet port 32H as the lubricant oil 46. On the other hand, this lubricant oil 46 lubricates the respective rotating side brake disks 39, the respective non-rotating side brake disks 40, and the like and then flows back to the operating oil tank 52 through the lubricant oil outlet port 33A of the lid member 33. It is to be noted that a throttle 61 that restricts the return oil flowing through the lubricant oil line 60 is provided in the middle of the lubricant oil line 60.

As described above, in this embodiment, the lubricant oil 46 constantly circulates in the brake case 31 through the lubricant oil inlet port 32H of the case body 32 and the lubricant oil outlet port 33A of the lid member 33. As a result, for example, in case of suddenly stopping the revolving operation of the upper revolving structure 3 by the wet braking device 30, even if a large amount of heat is generated by the frictional engagement between the rotating side brake disks 39 and the non-rotating side brake disks 40, this heat can be efficiently cooled by the lubricant oil 46 circulating in the brake case 31.

The revolving apparatus 11 according to this embodiment has the above-described configuration, and an operation of this apparatus will now be explained.

As shown in FIG. 5, when the hydraulic excavator 1 is stopped, the brake control valve 59 maintains the brake position (a), whereby the supply of the pressure oil to the oil chamber 45 of the wet braking device 30 is stopped. Accordingly, the brake piston 41 frictionally engages the respective rotating side brake disks 39 and the respective non-rotating side brake disks 40 with each other by using the pushing force of the spring member 42. As a result, the braking force is given to the motor shaft 25, and the upper revolving structure 3 maintains a stationary state on the lower traveling structure 2.

Next, when the engine 51 of the hydraulic excavator 1 is operated, a signal is supplied to the solenoid operated pilot portion 59A of the brake control valve 59, and the brake control valve 59 is switched to the brake release position (b). As a result, the pilot pressure oil discharged from the pilot pump 49 is partially supplied into the oil chamber 45 through the pilot line 53, the brake control valve 59, the brake release pressure line 58, and the brake release pressure inlet port 32J of the brake case 31. Consequently, as shown in FIG. 3, the brake piston 41 moves away from the rotating side brake disks 39 against the spring member 42, and the frictional engagement between the respective rotating side brake disks 39 and the respective non-rotating side brake disks 40 is released, thereby releasing braking with respect to the motor shaft 25.

In this state, when the motor shaft 25 of the electric motor 21 rotates, the rotation of this motor shaft 25 is decelerated in three stages by the respective planetary gear reduction mechanisms 18, 19, and 20 of the reduction device 12 to be transmitted to the output shaft 27, and the pinion 27B rotates with large turning force (torque). Further, since the pinion 27B moves along the inner race 5A while meshing with the internal teeth 5D provided on the inner race 5A of the swing circle 5, the revolving force of this pinion 27B is transmitted to the revolving frame 3A through the housing 13. Therefore, the upper revolving structure 3 can revolve on the lower traveling structure 2.

At this time, the return oil that flows back to the operating oil tank 52 from the various kinds of hydraulic actuators mounted in the hydraulic excavator 1 is partially supplied as the lubricant oil 46 into the brake case 31 from the lubricant oil line 60 through the lubricant oil inlet port 32H. Further, this lubricant oil 46 lubricates the respective rotating side brake disks 39, the respective non-rotating side brake disks 40, and the like and then flows back to the operating oil tank 52 through the lubricant oil outlet port 33A of the lid member 33.

In this case, the oil seal 48 is provided on the outer peripheral side of the motor shaft 25. Therefore, the oil seal 48 can assuredly prevent the lubricant oil 46 in the brake case 31 from entering the electric motor 21, thereby extending a lifetime of the electric motor 21.

Moreover, since the dust seal 47 is provided to the bearing 37 arranged above the oil seal 48 in order to rotatably support the adapter 36, dust such as abrasion powder generated from the wet braking device 30 can be captured by the dust seal 47. As a result, since the dust can be prevented from adhering to the contact part between the lip portion 48A of the oil seal 48 and the motor shaft 25 to extend the lifetime of the oil seal 48, the lubricant oil 46 can be prevented from entering the electric motor 21 for a long time, thereby enhancing the reliability of the entire revolving apparatus 11.

Subsequently, for example, when performing emergency stop of the revolving operation of the upper revolving structure 3 for some reason, supply of a signal to the solenoid operated pilot portion 59A of the brake control valve 59 is interrupted, and the brake control valve 59 is switched from the brake release position (b) to the brake position (a). As a result, supply of the pressure oil to the oil chamber 45 of the wet braking device 30 is stopped, and braking force is given to the motor shaft 25 when the brake piston 41 frictionally engages the respective rotating side brake disks 39 with the respective non-rotating side brake disks 40 by using pushing force of the spring member 42, whereby the revolving operation of the upper revolving structure 3 can be stopped.

In this case, according to this embodiment, the return oil from the various kinds of hydraulic actuators is supplied into the brake case 31 as the lubricant oil 46, and this lubricant oil 46 constantly circulates in the brake case 31 through the lubricant oil inlet port 32H provided on the lower end side of the case body 32 and the lubricant oil outlet port 33A provided in the lid member 33. As a result, in case of suddenly stopping the revolving operation of the upper revolving structure 3 by the wet braking device 30, even if heat is generated due to the frictional engagement between the rotating side brake disks 39 and the non-rotating side brake disks 40, this heat can be efficiently cooled by the lubricant oil 46 circulating in the brake case 31.

Additionally, the lubricant oil outlet port 33A is provided in the lid member 33 placed in the upper end portion of the brake case 31. Therefore, even if air is mixed in the lubricant oil 46 flowing into the brake case 31, this air can be assuredly discharged to the outside of the brake case 31 through the lubricant oil outlet port 33A. As a result, since the air can be prevented from staying in the brake case 31 and the brake case 31 can be constantly filled with a large amount of the lubricant oil 46, it is possible to enhance the cooling effect for the heat generated due to the frictional engagement between the rotating side brake disks 39 and the non-rotating side brake disks 40.

Further, the lubricant oil 46 that has flowed into the brake case 31 passes through the space between the rotating side brake disks 39 and the non-rotating side brake disks 40 and then flows to the outside of the brake case 31 through the lubricant oil outlet port 33A. As a result, dust such as abrasion powder produced from a frictionally engaged portion between each rotating side brake disk 39 and each non-rotating side brake disk 40 flows to the outside by the lubricant oil 46, thereby cleaning the inside of the brake case 31. Consequently, the braking force of the wet braking device 30 can be appropriately maintained for a long time, thus improving this reliability.

Furthermore, in this embodiment, the operating oil supplied to the hydraulic actuator such as a hydraulic motor for traveling (not shown) mounted in the lower traveling structure 2 or a hydraulic cylinder provided to the working mechanism 4 is utilized as the lubricant oil 46 for cooling the wet braking device 30. Therefore, any special lubricant oil does not have to be used to just cool the wet braking device 30, and a tank for holding this lubricant oil and others are not required. As a result, the number of components in the entire wet braking device 30 can be decreased, which contributes to a reduction in cost.

Subsequently, since the above-described revolving operation of the upper revolving structure 3 is repeated for a long time, the rotating side brake disk 39 and the non-rotating side brake disk 40 of the wet braking device 30 are gradually worn away, and hence a maintenance operation such as maintenance or inspection of the wet braking device 30 must be periodically carried out.

In this case, according to this embodiment, the wet braking device 30 is arranged on the upper end side of the electric motor 21. Therefore, when performing the maintenance operation for the wet braking device 30, e.g., replacing the rotating side brake disks 39 and the non-rotating side brake disks 40, the wet braking device 30 alone can be solely removed to carryout the maintenance operation while keeping the electric motor 21 assembled with respect to the reduction device 12. Additionally, the revolving apparatus 11 can be rapidly assembled by just disposing the wet braking device 30, which has been through the maintenance, to the upper end side of the electric motor 21. As described above, since the other members such as the electric motor 21 and the like do not have to be removed in order to detach the wet braking device 30, the workability at the time of performing the maintenance operation for the wet braking device 30 can be improved.

Further, a part of the upper side of the motor shaft 25, namely, the upper male spline portion 25B is accommodated in a state of protruding into the brake case 31, and the adapter 36 is detachably disposed to the upper male spline portion 25B of the motor shaft 25. Therefore, the plurality of rotating side brake disks 39 can be engaged with and disposed to the brake disk engaging groove 36B provided on the outer peripheral side of the adapter 36. Consequently, for example, as compared with a case in which the plurality of rotating side brake disks 39 are directly disposed to the outer peripheral side of the motor shaft 25, it is possible to avoid an inconvenience that the engaged part of the motor shaft 25 for each rotating side brake disk 39 is damaged, whereby the lifetime of the electric motor 21 including the motor shaft 25 can be extended.

Furthermore, as shown in FIG. 4, the plurality of rotating side brake disks 39 are engaged with the brake disk engaging groove 36B of the adapter 36, and the plurality of non-rotating side brake disks 40 are arranged between the respective rotating side brake disks 39 while alternately overlapping these disks. Therefore, in this embodiment, an assembly (a subassembly) having the plurality of rotating side brake disks 39 and the plurality of non-rotating side brake disks 40 disposed to the outer peripheral side of the adapter 36 can be assembled in advance.

On the other hand, in a state in which the case body 32 of the brake case 31 is assembled to the motor case 22 of the electric motor 21, the lid member 33 and the brake piston 41 are removed. In this state, the assembly (the subassembly) having the rotating side brake disks 39 and the non-rotating side brake disks 40 disposed to the outer periphery of the adapter 36 is inserted into the case body 32. Next, the female spline portion 36A of the adapter 36 is engaged with the upper male spline portion 25B of the motor shaft 25, and each non-rotating side brake disk 40 is engaged with the engaging recessed groove 32F of the case body 32. As a result, the rotating side brake disks 39 and the non-rotating side brake disks 40 can be integrally and easily assembled.

Therefore, for example, it is possible to eliminate a complicated assembling operation, i.e., alternately overlapping and arranging the plurality of rotating side brake disks 39 and the non-rotating side brake disks 40 one by one on the outer peripheral side of the motor shaft 25 and the inner peripheral side of the case body 32, and the workability at the time of assembling the wet braking device 30 to the electric motor 21 can be greatly improved.

It is to be noted that, in the foregoing embodiment, the case has been illustrated in which the housing 13 of the reduction device 12 is disposed to the revolving frame 3A and the motor case 22 of the electric motor 21 is disposed to the upper end side of this housing 13. However, the present invention is not limited to this particular example. For instance, it is possible to adopt a configuration that the reduction device and the electric motor are arranged in a single housing disposed to the revolving frame and the braking device is detachably disposed to the upper end side of this single housing, for example.

Additionally, in the above-described embodiment, the description has been given by taking a case as an example in which the lubricant oil 46 supplied through the return line 56 of the main line is applied as cooling means for cooling the rotating side brake disks 39 and the non-rotating side brake disks 40. However, the present invention is not limited to this particular example, and it is possible to use the return oil of the pilot pressure oil supplied to the hydraulic pressure pilot portions of various kinds of the control valves by branching the pilot line 53, for example. Further, as a cooling oil for cooling the rotating side brake disks 39 and the non-rotating side brake disks 40, an independent pressure oil supply line or an exclusive supply source may be used separately from the existing return line 56 and pilot line 53.

Furthermore, in the foregoing embodiment, the example of the revolving apparatus 11 applied to the hydraulic excavator 1 has been described. However, the present invention is not limited to this particular example, and it can be widely applied to other construction machines such as a hydraulic crane including the revolving apparatus.

DESCRIPTION OF REFERENCE NUMERALS

1: Hydraulic excavator (Construction machine)
2: Lower traveling structure
3: Upper revolving structure
5: Swing circle
11: Revolving apparatus
12: Reduction device
21: Electric motor
25: Motor shaft
25B: Upper male spline portion
27: Output shaft
30: Wet braking device
31: Brake case
32: Case body
32C: Shaft through hole
32E: Brake disk accommodating recessed portion
32G: Piston insertion hole
32H: Lubricant oil inlet port
32J: Brake release pressure inlet port
33: Lid member
33A: Lubricant oil outlet port
36: Adapter
36A: Female spline portion
36B: Brake disk engaging groove
37: Bearing
39: Rotating side brake disk
40: Non-rotating side brake disk
41: Brake piston
42: Spring member
45: Oil chamber
46: Lubricant oil
47: Dust seal
48: Oil seal

The invention claimed is:

1. A revolving apparatus for a construction machine, comprising:
   a reduction device which is disposed on an upper revolving structure mounted on a lower traveling structure through a swing circle so as to extend in the upper and lower directions, said reduction device decelerates an input rotation of a motor shaft and outputs said decelerated rotation to an output shaft;
   an electric motor which is arranged on said reduction device and inputs rotation of said motor shaft to said reduction device;
   said output shaft which outputs the rotation of said motor shaft decelerated by said reduction device to said swing circle, and
   a wet braking device which gives braking force with respect to the rotation of said motor shaft and is provided on an upper end side of said electric motor,
   wherein said wet braking device includes:
      a brake case which is disposed on an upper end side of said electric motor and accommodates an upper end portion of said motor shaft therein and a lubricating oil;
      an adapter which is detachably attached to said motor shaft in said brake case;

a plurality of rotating side brake disks arranged on an outer peripheral side of said adapter in said brake case;

a plurality of non-rotating side brake disks arranged on an inner peripheral side of said brake case that alternately overlap said respective rotating side brake disks;

a brake piston which provides braking force to said motor shaft using a pushing force of a spring member to frictionally engage said rotating side brake disks and said non-rotating side brake disks with each other and release braking force with respect to said motor shaft against said spring member based on a supply of a brake release pressure; and a lubricant oil inlet port disposed near said rotating side brake disks and said non-rotating side brake disks and through which lubricant oil flows in is provided on a lower end side of said brake case, and a lubricant oil outlet port through which lubricant oil flowing between said rotating side brake disks and said non-rotating side brake disks flows out is provided in an upper end portion of said brake case.

2. A revolving apparatus for a construction machine according to claim 1, wherein a bearing, which rotatably supports said adapter with respect to said brake case, is provided between said adapter and said brake case, wherein a dust seal, which captures foreign particles mixed in a lubricant oil, is provided on a side of said bearing, and wherein an oil seal, which is placed below said bearing and seals in a lubricant oil with respect to said electric motor, is provided on an outer peripheral side of said motor shaft.

3. A revolving apparatus for a construction machine according to claim 1, wherein a lubricant oil uses a part of an operating oil supplied to hydraulic actuators mounted in said upper revolving structure and said lower traveling structure.

4. A revolving apparatus for a construction machine according to claim 1, further including:

male spline portion provided to an upper end portion of said motor shaft, a female spline portion which engages with said male spline portion of said motor shaft and provided on the inner peripheral side of said adapter, wherein said brake case further includes:

a cylindrical case body which is opened on an upper side and accommodates said motor shaft, said adapter, said rotating side brake disks, said non-rotating side brake disks, said brake piston, and said spring member, and a lid member that covers an upper side of said case body, and said adapter, said rotating side brake disks, and said non-rotating side brake disks are disposed to said male spline portion of said motor shaft in the upper and lower directions with said lid member removed from said case body.

* * * * *